US006499715B1

United States Patent
Furuya et al.

(10) Patent No.: US 6,499,715 B1
(45) Date of Patent: Dec. 31, 2002

(54) RESIN MOLD

(75) Inventors: Tamio Furuya, Hidaka; Kenichi Chujo, Sayama; Kazushiro Wakabayashi, Sayama; Satoru Yamada, Sayama; Hiroe Hashimoto, Sayama, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/461,104

(22) Filed: Dec. 14, 1999

(30) Foreign Application Priority Data

| Dec. 14, 1998 | (JP) | 10-355167 |
| Apr. 5, 1999 | (JP) | 11-098174 |
| Apr. 6, 1999 | (JP) | 11-098838 |
| Nov. 5, 1999 | (JP) | 11-315297 |

(51) Int. Cl.$^7$ ............................................. B29C 51/10
(52) U.S. Cl. ........................... 249/80; 249/116; 249/79; 264/219
(58) Field of Search ......................... 249/79, 80, 114.1, 249/116; 264/219, 227

(56) References Cited

U.S. PATENT DOCUMENTS

| 2,510,907 A | * | 6/1950 | Renaud ........................ 249/79 |
| 3,001,582 A | * | 9/1961 | Kindseth et al. ............. 249/113 |
| 3,166,615 A | * | 1/1965 | Farrell ......................... 264/413 |
| 3,216,074 A | * | 11/1965 | Harrison ...................... 164/146 |
| 3,880,563 A | * | 4/1975 | De Vos ........................ 425/175 |
| 3,932,096 A | * | 1/1976 | Kartman ....................... 249/79 |
| 3,993,727 A | * | 11/1976 | Skilletz et al. .............. 425/175 |
| 4,631,228 A | | 12/1986 | Kruger ..................... 428/316.6 |
| 4,781,569 A | * | 11/1988 | Kinugasa et al. ........... 425/504 |
| 4,948,537 A | | 8/1990 | Ohkoshi et al. ............. 264/2.5 |
| 5,156,754 A | * | 10/1992 | Nomura et al. ............. 294/135 |
| 5,176,839 A | * | 1/1993 | Kim ............................. 249/78 |

FOREIGN PATENT DOCUMENTS

| EP | 0 487 868 A2 | 10/1991 | |
| JP | 4-176611 | * 6/1992 | ................. 264/219 |
| JP | 7-106576 | 11/1995 | |

OTHER PUBLICATIONS

Search Report dated May 23, 2000.

* cited by examiner

Primary Examiner—Jan H. Silbaugh
Assistant Examiner—Thu Khanh T. Nguyen
(74) Attorney, Agent, or Firm—Merchant & Gould, P.C.

(57) ABSTRACT

A resin mold has a surface layer formed on the molding surface of a main body from a thermosetting resin and containing fine particles of silicon carbide. The surface layer can be formed simply by thermosetting the resin without calling for any plating, so that the mold can be made in a short time. The high hardness of silicon carbide gives a high wear resistance to the surface layer. The main body is formed from a thermosetting resin and contains metal particles.

2 Claims, 14 Drawing Sheets

FIG.4B
(EMBODIMENT)

FIG.12A (EMBODIMENT)

FIG.12B (EMBODIMENT)

RESIN MOLD

BACKGROUND OF THE INVENTION

1. Field of the Invention

This invention relates to an improved resin mold or pattern used for making, for example, a vehicular panel or sheet.

2. Description of the Related Art

A known resin mold for making a vehicular panel or sheet by vacuum or press forming is disclosed in, for example, Japanese Patent Publication No. HEI-07-106576 entitled "RESIN MOLD". The mold has an electrically conductive intermediate layer of a polymer formed on a thermosetting resin, and a metal plating layer formed on the surface of the intermediate layer by, for example, nickel plating. The metal plating layer is required to have a sufficiently large thickness ranging, for example, from 50 to 300 microns to ensure durability. The formation of such a thick layer, however, requires a lot of time which is undesirable from the standpoint of productivity in a job of mold manufacture. Moreover, the layer is not satisfactory in wear resistance, since it is formed simply by plating the surface of the intermediate layer with, for example, nickel, chromium, copper or zinc. It is likely to get worn relatively soon if the mold is used for vacuum or press forming vehicular panels or sheets repeatedly.

Therefore, there is also known a resin mold which does not have any such plating layer, but is satisfactory in wear resistance, and can be made in a relatively short time. The mold has a wall structure as fragmentarily shown in FIG. 14. The mold 100 comprises a main body 105 and a surface layer 101 formed on its surface. The main body 105 is formed from a thermosetting epoxy resin 107 containing aluminum particles 106. The surface layer 101 is formed from a thermosetting epoxy resin 103 containing aluminum flakes 102. The surface layer 101 has a molding surface 108 having recesses 108a and protrusions 108b by which an uneven, or grained surface is formed on the surface 110a of a sheet 110, as described below.

Figure 14:
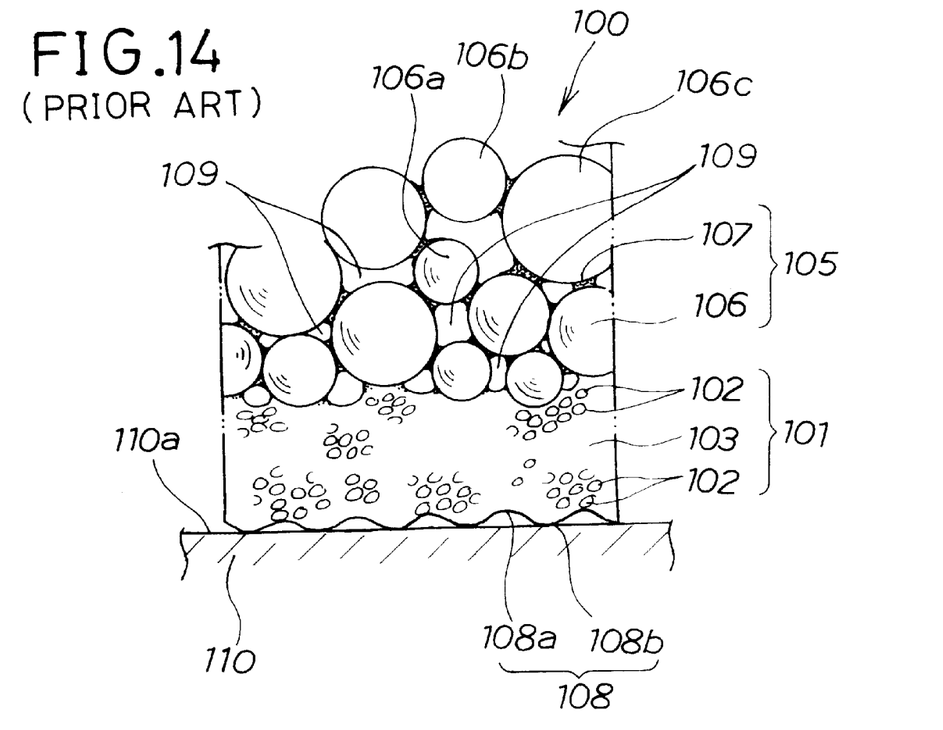
FIG. 14 is a view similar to FIG. 2, but showing the prior art.

When the mold 100 is used for press forming the sheet 110, it is cooled to 50° C., while the sheet 110 is heated to 180° C. Then, its surface layer 101 is pressed against the sheet 110 to form it into a desired shape. The heat of the sheet 110 is transferred to the surface layer 101, and main body 105 of the mold 100 to raise its temperature to 120° C. Then, the mold 100 is opened, the sheet is removed therefrom, and after it is cooled to 50° C. again, the process as described above is repeated for another sheet. For raising the productivity of the press forming operation, therefore, it is important to cool the mold 100 from 120° C. to 50° C. quickly and shorten the time for which it has to wait to be cooled. The aluminum particles 106 in the main body 105 of the mold 100 are, however, not uniform in size, but include large and small particles. Therefore, the aluminum particles 106 are not joined together in a regular mold, and there are, for example, small particles 106a not contacting medium-sized or large particles 106b or 106c. The failure of those small particles 106a to contact medium-sized or large particles 106b or 106c makes it difficult for the main body 105 to have a high thermal conductivity. Thus, the mold 100 has to wait for so long a time to be cooled from 120° C. to 50° C. and become ready again that it is difficult to obtain a high productivity in any press forming operation. Moreover, the main body 105 is low in strength, since small aluminum particles 106a are not securely held by medium-sized or large ones 106b or 106c.

The surface layer 101 contains a large amount of thermosetting resin 103, since it fills the interstices between the aluminum flakes 102 densely. On the other hand, the main body 105 contains a small amount of thermosetting resin 107, as compared with that of the resin 103 in the surface layer 101, since it has a porous structure formed by the aluminum particles 106 not uniform in size, but creating open pores 109 which are required for the evacuation of the cavity of the mold. As the thermosetting resin 103 or 107 has a higher coefficient of linear expansion (hereinafter referred to as coefficient of thermal expansion) than aluminum, the surface layer 101, or main body 105 has a coefficient of thermal expansion depending on the amount of the thermosetting resin 103 or 107 which it contains. As the surface layer 101 contains a larger amount of resin, it has a higher coefficient of thermal expansion, but its thermal expansion is restricted by the main body 105. As a result, a high stress is produced in the surface layer 101 and this eventually causes it to crack.

SUMMARY OF THE INVENTION

It is, therefore, a first object of this invention to provide a resin mold which can be made in a short time and is excellent in wear resistance.

It is a second object of this invention to provide a resin mold which is improved in thermal conductivity and strength.

It is a third object of this invention to provide a resin mold having a sufficiently small difference in coefficient of thermal expansion between its layers to prevent any cracking of its surface layer.

According to a first aspect of this invention, there is provided a resin mold which comprises a main body formed from a thermosetting resin containing metal particles and having a molding surface, and a surface layer formed on the molding surface from a thermosetting resin and containing fine particles of silicon carbide.

This surface layer can be formed simply by thermosetting the resin. As it does not call for any plating, the mold can be made in a short time. The silicon carbide in the surface layer is high in hardness and wear resistance, and makes it resistant to wear.

The resin forming the surface layer preferably contains 50 to 80% by weight of silicon carbide. If the proportion of silicon carbide is less than 50% by weight, the surface layer may not be satisfactorily resistant to wear, as its entire surface may not be completely covered with silicon carbide. If its proportion exceeds 80% by weight, the surface layer is difficult to form, since the proportion of the resin is too small for its satisfactory fluidity.

The main body has a porous structure defined by open spaces formed between the adjoining metal particles and enabling the mold to be evacuated.

According to a second aspect of this invention, there is provided a resin mold which comprises a main body formed by metal particles held together with a thermosetting resin and having a molding surface, and a surface layer formed on its molding surface from a thermosetting resin, the metal particles being spherical and substantially equal in diameter, every adjoining three of those particles contacting each other.

The mold has a high thermal conductivity owing to the spherical metal particles having substantially the same diameter and therefore maintaining contact between every two adjoining ones. When the mold is used for shaping, for example, a sheet, the heat transferred from the sheet to the mold can be dissipated effectively, so that the mold can be cooled in a short time. Moreover, every two adjoining metal particles are held fast by each other and thereby contribute to improving the strength of the mold.

The spherical metal particles preferably have a diameter of 0.3 to 3.0 mm. If their diameter is smaller than 0.3 mm, the open spaces formed between every three adjoining particles are too small for evacuation purposes. If their diameter exceeds 3.0 mm, the open spaces are too large for the mold to maintain a high thermal conductivity.

According to a third aspect of this invention, there is provided a resin mold which comprises a main body formed from a thermosetting resin containing metal particles and having a molding surface, an intermediate layer formed on its molding surface from a thermosetting resin containing pieces of a nonwoven metal fabric, and a surface layer formed on the intermediate layer from a thermosetting resin, the intermediate layer having a coefficient of thermal expansion which is lower than that of the surface layer and higher than that of the main body.

The intermediate layer having a coefficient of thermal expansion as defined above is intended for mitigating a large difference in the degree of thermal expansion which may arise between the surface layer and the main body. The thermal expansion of the surface layer is not restricted by the intermediate layer supporting it, nor is the thermal expansion of the intermediate layer restricted by the main body supporting it. Therefore, it is possible to lessen any stress produced in not only the surface layer, but also the intermediate layer, and thereby prevent their cracking. The nonwoven metal fabric which the intermediate layer contains in the resin gives the mold a high thermal conductivity.

The main body preferably has open spaces formed by every two adjoining metal particles, through which the mold can be evacuated.

BRIEF DESCRIPTION OF THE DRAWINGS

Certain preferred embodiments of this invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
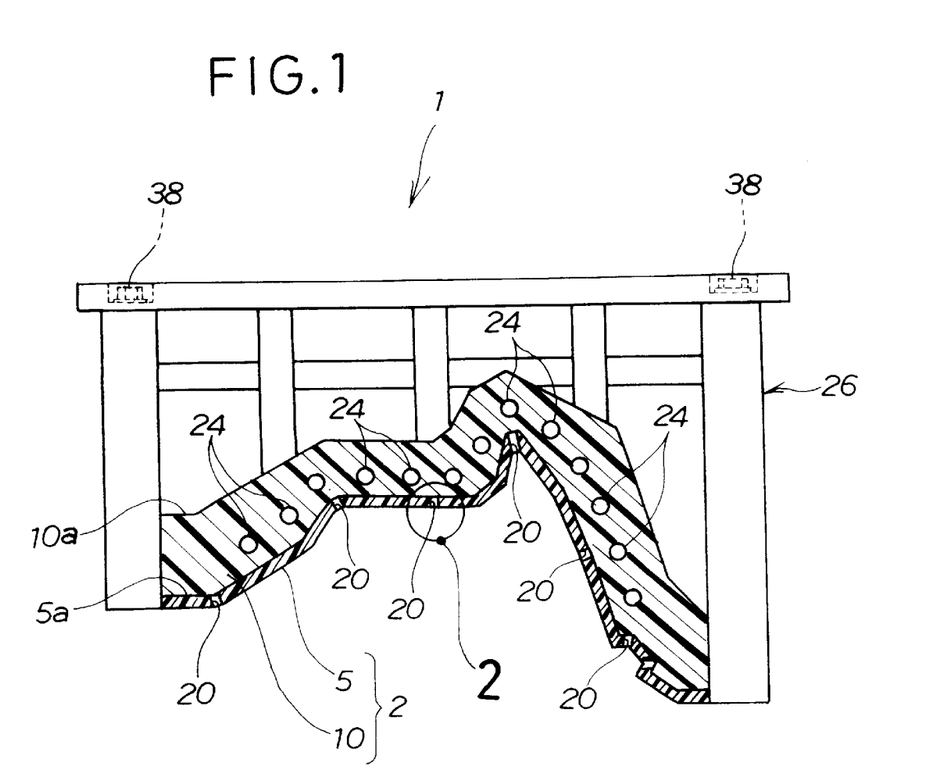
FIG. 1 is a side elevational view, partly in section, of a mold including a resin mold according to a first preferred embodiment of this invention.

Referring first to FIG. 1, there is shown a mold assembly 1 comprising a resin mold or pattern 2 according to the first preferred embodiment of this invention and a framework 26 for supporting the mold 2. The mold 2 comprises a main body 10 and a surface layer 5 formed on that surface of the main body 10 along which a product is formed. The main body 10 is formed by metal particles joined together with a thermosetting resin. The main body 10 is provided with a plurality of cooling pipes 24 laid in an array along the contour of the rear surface 5a of the surface layer 5. The surface layer 5 is formed from a thermosetting resin containing fine particles of silicon carbide (SiC). The surface layer 5 has a plurality of evacuating bores 20. The framework 26 is attached to the main body 10 along its rear surface 10a.

Figure 2:
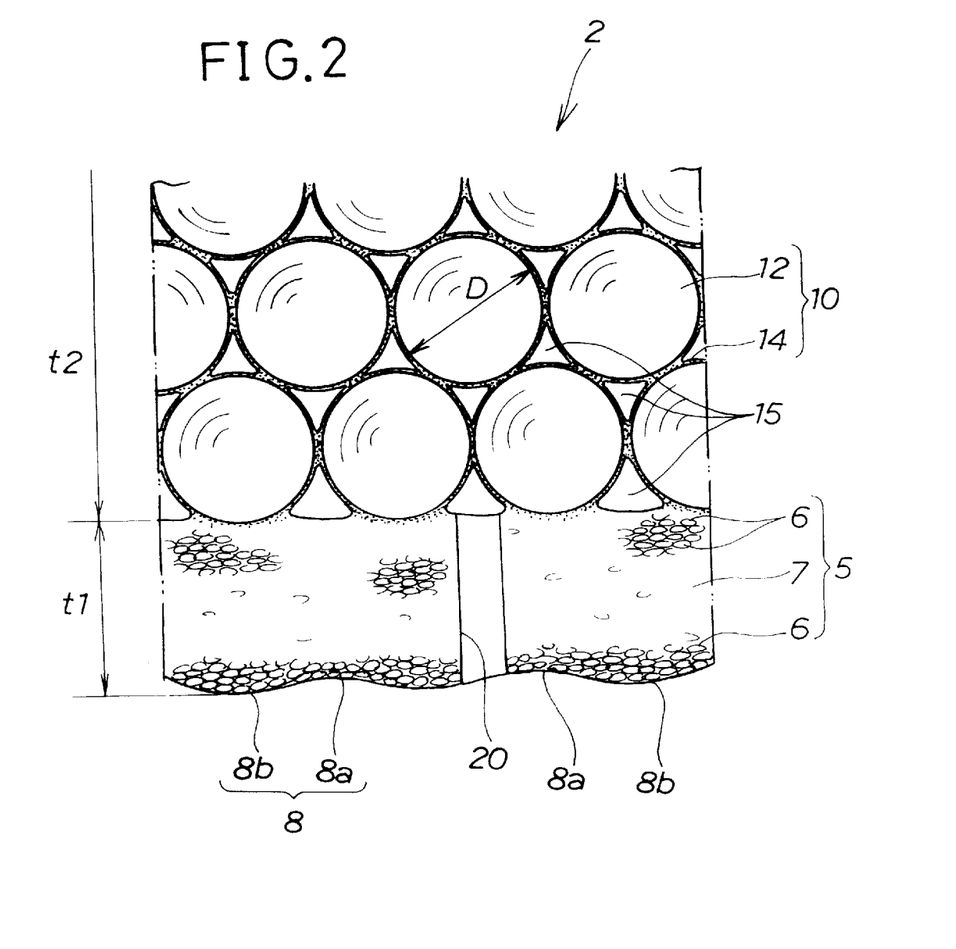
FIG. 2 is an enlarged view of the portion surrounded by a circle 2 in FIG. 1.

FIG. 2 shows the main body 10 and the surface layer 5 in enlarged detail. The thermosetting resin 7 forming the surface layer 5 contains about 50 to 80% by weight of fine particles 6 of silicon carbide. The thermosetting resin 7 may, for example, be an epoxy, polyurethane or polyurea resin. The surface layer 5 may have a thickness t1 of, say, about 1 to 5 mm. The surface layer 5 has a molding surface 8 facing a cavity not shown, and having recesses 8a and protrusions 8b for forming a grained surface on a product. The silicon carbide particles 6 preferably have a diameter as small as, say, about 10 microns, though they can be of a different diameter if they ensure the wear resistance of the surface layer 5.

The resin 7 contains at least about 50% by weight of silicon carbide particles 6, so that particles 6 may fill the surface layer 5 closely along its recesses 8a and protrusions 8b and thereby improve its wear resistance. The proportion of the particles 6 is, however, not higher than about 80% by weight, so that the resin 7 may remain in a sufficiently high proportion to bind the particles 6 together and ensure the strength of the surface layer 5. Such a proportion of the resin also ensures its satisfactory fluidity prior to thermosetting and thereby facilitates the formation of the surface layer 5 in a short time.

The main body 10 is formed by metal particles, steel balls 12, and a thermosetting resin 14 adhering to their spherical surfaces and joining the adjoining balls 12 to one another. The resin 14 may, for example, be an epoxy, polyurethane or polyurea resin. The main body 10 may have a thickness t2 of, say, at least about 5 mm. Every three adjoining steel balls 12 form therebetween open spaces 15 giving a porous structure to the main body 10. The open spaces 15 are connected with one another and cooperate with the evacuating bores 20 of the surface layer 5 in evacuating the mold.

The steel balls 12 have an equal diameter D in the range of about 0.3 to 3.0 mm. As the balls 12 have the same diameter, they are arranged so regularly that every two adjoining balls 12 contact each other. Thus, the main body 10 has a high thermal conductivity. The main body 10 also has a high strength, since the adjoining balls 12 contacting each other are held fast to each other. If the diameter D of the balls 12 is smaller than about 0.3 mm, the open spaces 15 are too small to be suitable for evacuation. If it exceeds about 3.0 mm, the open spaces 15 are too large for the main body 10 to maintain a high thermal conductivity. Balls of a metal having a high thermal conductivity, such as copper or aluminum, can alternatively be used as the metal particles 12.

Figure 3A:
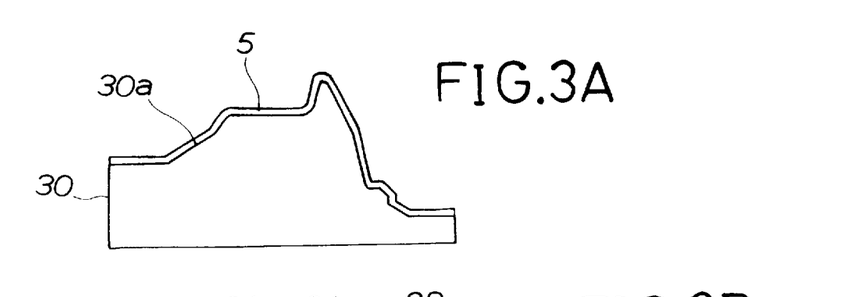
FIGS. 3A to 3D are a series of views illustrating a process for manufacturing the mold shown in FIG. 1.
Figure 3B:
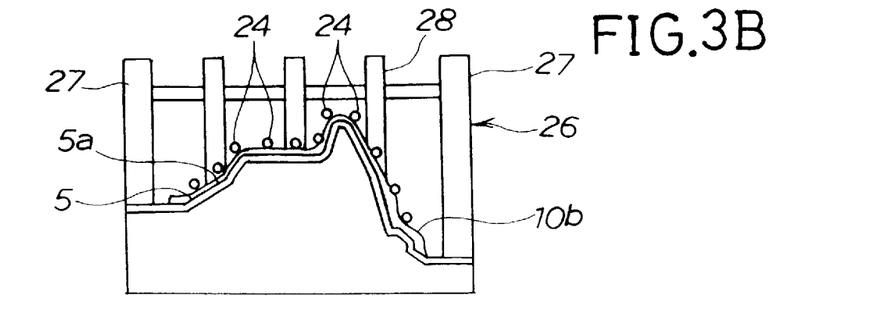
Figure 3C:
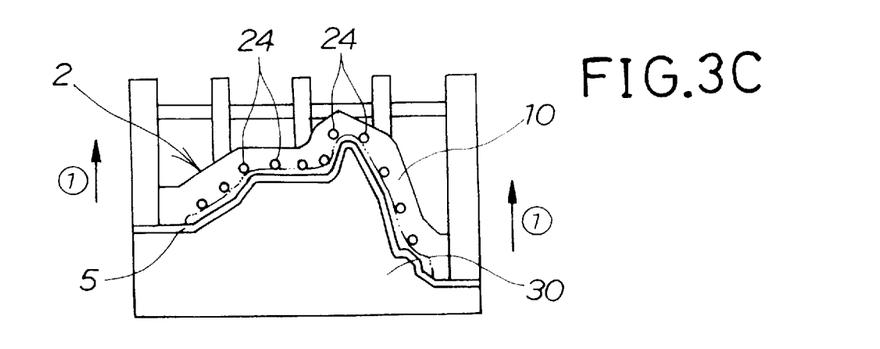
Figure 3D:
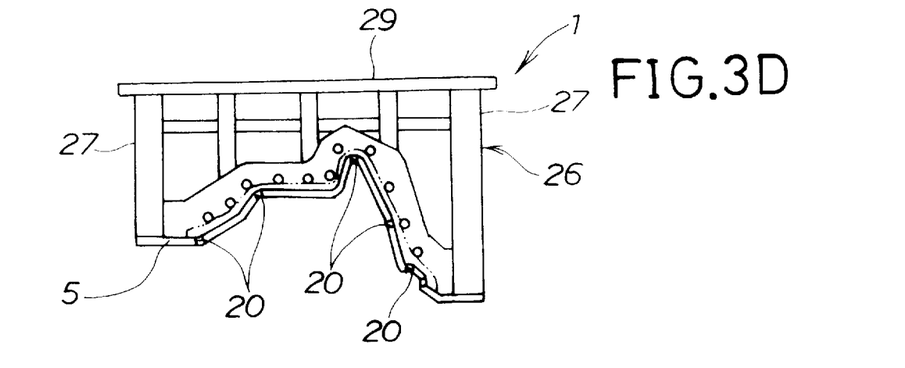

Reference is now made to FIGS. 3A to 3D showing a process for making a resin mold having the construction as described above. A thermosetting resin, such as an epoxy resin, containing particles of silicon carbide is applied onto the surface 30a of a master model 30, and thermoset to form a surface layer 5, as shown in FIG. 3A. An epoxy resin containing steel balls is, for example, applied onto the rear surface 5a of the surface layer 5 to form a portion 10b of a main body 10 (see FIG. 1) a few mm in thickness, as shown in FIG. 3B. A plurality of cooling pipes 24 are laid along the portion 10b of the main body 10, and a plurality of posts 27 and 28 are placed in position to form a framework 26, as shown in FIG. 3B. Then, the main body 10 is formed with epoxy resin (or polyurethane, polyurea resin) coating steel balls around the cooling pipes 24 to complete a resin mold 2, as shown in FIG. 3C. The mold 2 is lifted in the directions of arrows (1) away from the master model 30. Finally, a plate 29 is secured to the tops of the posts 27 by bolts 32 (see FIG. 1), and a plurality of evacuating bores 20 are made in the surface layer 5, whereby a mold assembly 1 is obtained, as shown in FIG. 3D.

Figure 4A:
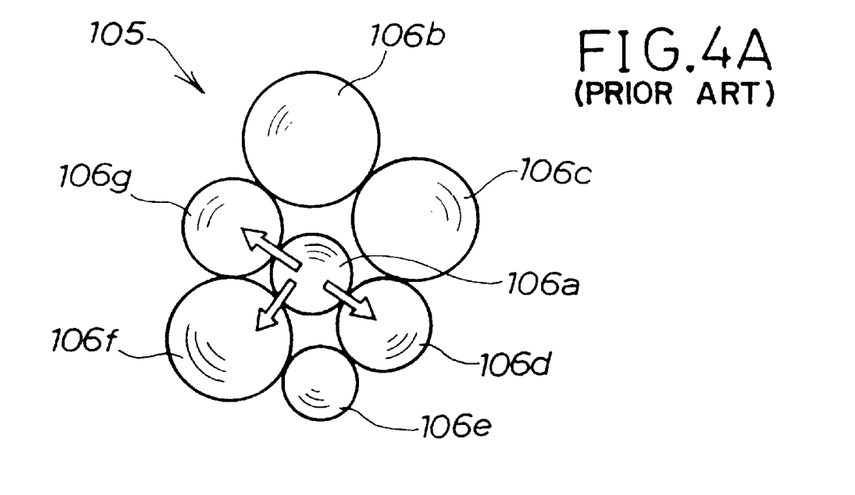
FIGS. 4A and 4B are a pair of views explaining the conduction of heat by metal particles in the main bodies of the mold constructed according to the prior art and the mold embodying the present invention, respectively.

Reference is now made to FIGS. 4A and 4B comparing the aluminum particles in the main body of the known mold as described with reference to FIG. 14 and the steel balls in the main body of the mold embodying this invention. The main body 105 of the known mold contain aluminum particles 106a to 106g which are not uniform in diameter, as shown in FIG. 4A. As a result, the particle 106a having a small diameter, for example, contacts the particles 106d, 106f and 106g, while not contacting the particle 106b, 106c or 106e, and its heat is conducted to only the three particles 106d, 106f and 106g contacting it as shown by the arrows, and does not contribute to raising the thermal conductivity of the main body 105 as a whole. Therefore, the known mold cannot effectively dissipate heat conducted from e.g. a sheet as shaped, its cooling thus requiring a relatively long time which makes it difficult to realize a highly productive sheet-shaping operation. Moreover, the main body 105 is difficult to improve in regard to strength, since the small particle 106a is not held fast by all the other particles surrounding it, insofar as it does not contact any of the particles 106b, 106c and 106e.

Figure 4B:
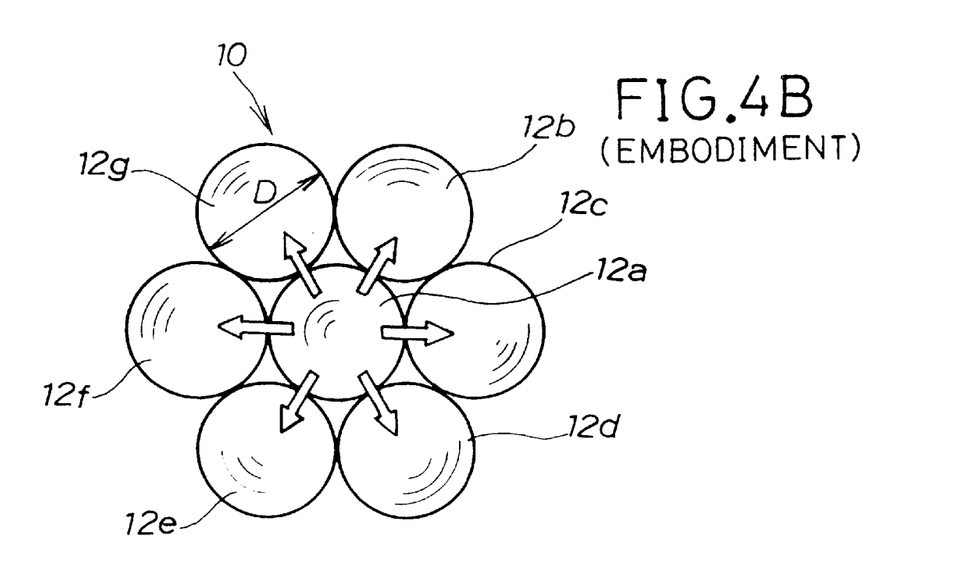

On the other hand, the main body 10 of the mold embodying this invention contain steel balls 12a to 12g which are all equal in diameter D, and every two adjoining balls are, therefore, in contact with each other, as shown in FIG. 4B. Therefore, the heat of, for example, the ball 12a is conducted to all of the other six balls 12b to 12g around it as shown by arrows, and the main body 10 has a high thermal conductivity. Thus, the mold embodying this invention can be cooled in a short time by dissipating effectively any heat conducted from a sheet as shaped. Moreover, the main body 10 has a high strength, since all of the balls 12a to 12g have an equal diameter which permits each ball to be held by the other balls adjoining it.

Figure 5A:
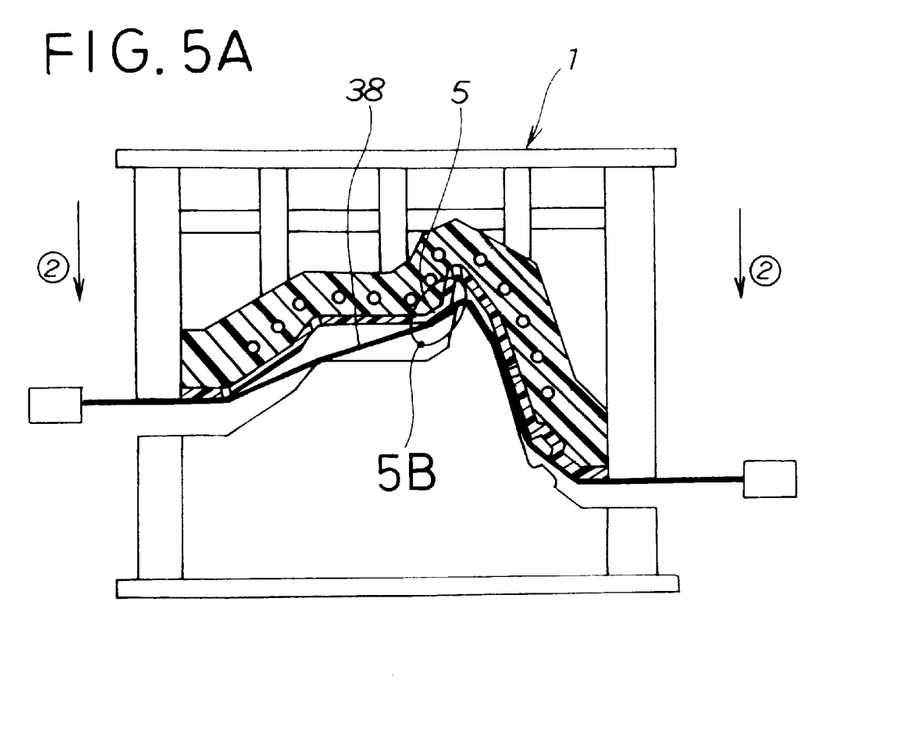
FIG. 5A is a view illustrating a process for shaping a sheet by the mold according to the first embodiment of this invention.
Figure 5B:
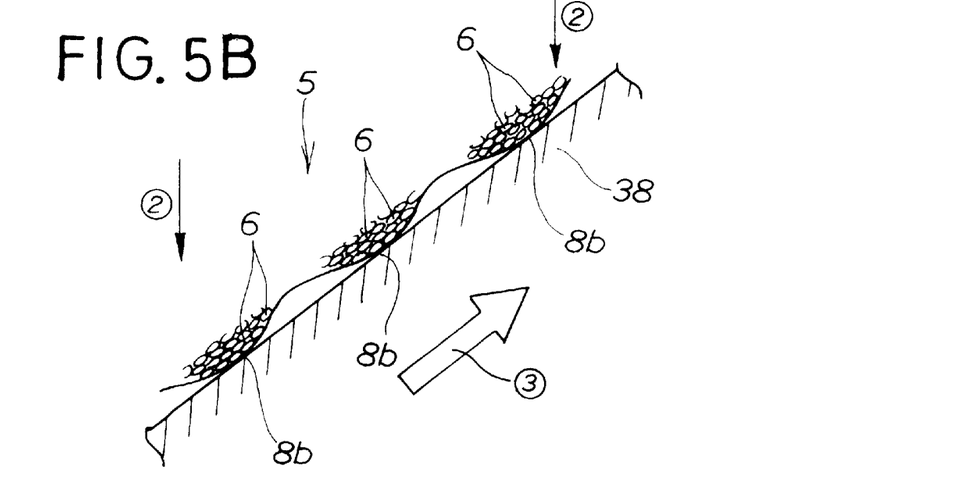
FIG. 5B is an enlarged view of the portion marked 5B in FIG. 5A.

FIGS. 5A and 5B show a process in which the resin mold embodying this invention as described above is used for shaping a sheet 38. The sheet 38 to be shaped is disposed between the resin mold 2 of the mold assembly 1, which is an upper mold, and a lower mold 3, and the mold assembly 1 is lowered toward the lower mold 3 as shown by arrows (2) in FIG. 5A. After it has been lowered to some extent, the mold 2 has its surface layer 5 brought into contact with the sheet 38. If the mold 2 is further lowered, the sheet 38 is moved in the direction of an arrow (3) in FIG. 5B, while contacting the protrusions 8b of the surface layer 5, and a frictional force is produced between the protrusions 8b and the sheet 38. The protrusions 8b are, however, protected against wear owing to the silicon carbide 6 which the surface layer 5 contains.

Figure 6:
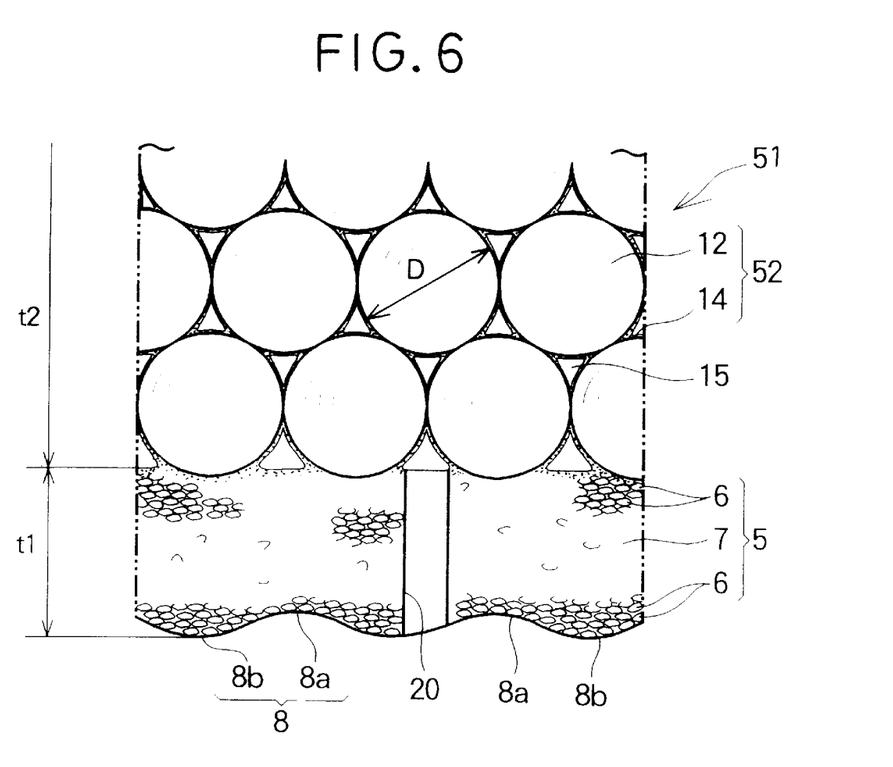
FIG. 6 is a view similar to FIG. 2, but showing a modified form of the mold, in which the adjoining metal particles in the main body are in direct contact with one another.

Reference is now made to FIG. 6 similar to FIG. 2, but showing a modified form of the resin mold according to the first embodiment of this invention. The modified mold 51 likewise contains steel balls 12 in its main body 52 and differs from the mold according to the first embodiment only in that every two adjoining balls 12 are in direct contact with each other without being separated from each other by any thermosetting epoxy, polyurethane or polyurea resin 14. The thermosetting resin 14 is generally likely to form a film on the surfaces of the steel balls 12 and between every two adjoining balls 12 upon thermosetting. The film formed therebetween is so thin as not to exert any substantial effect on the thermal conductivity of the main body, but if no such film is formed, the main body 52 has a still higher thermal conductivity. The modified mold 51 is, therefore, made by, for example, applying an adequate load to the main body 52 before the thermosetting of the resin 14 to remove any resin 14 from between every two adjoining steel balls 12 and thereby bring those balls 12 into direct contact with each other. Moreover, their direct contact makes it possible to form the open spaces 15 therebetween still more uniformly than in the mold shown in FIG. 2. The mold 51 can, therefore, be evacuated still more uniformly to make a vacuum formed sheet or panel product of higher quality.

Figure 7:
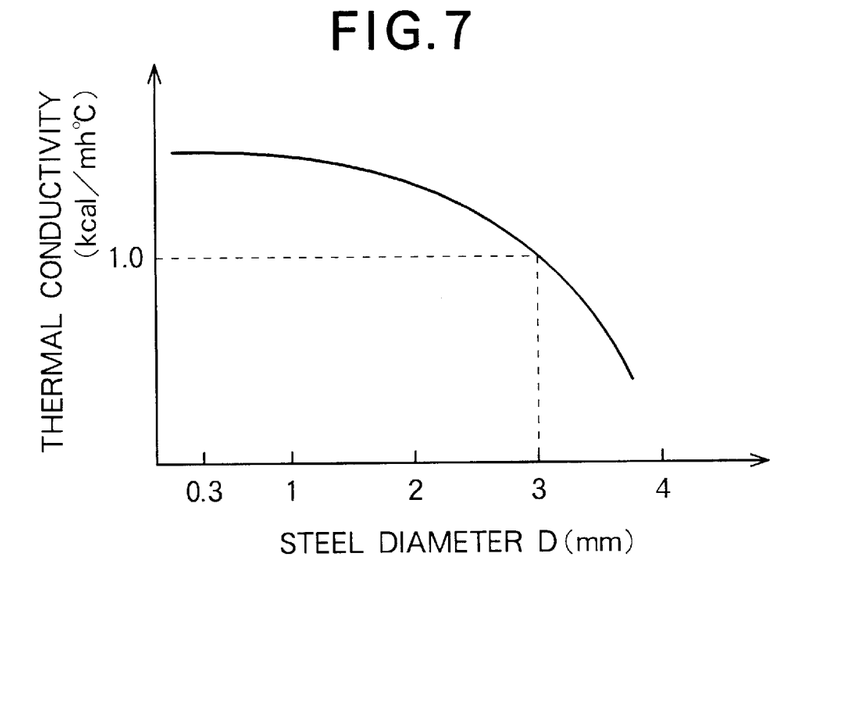
FIG. 7 is a graph showing the thermal conductivity of the mold according to the first embodiment in relation to the diameter of steel balls employed as the metal particles.
Figure 8:
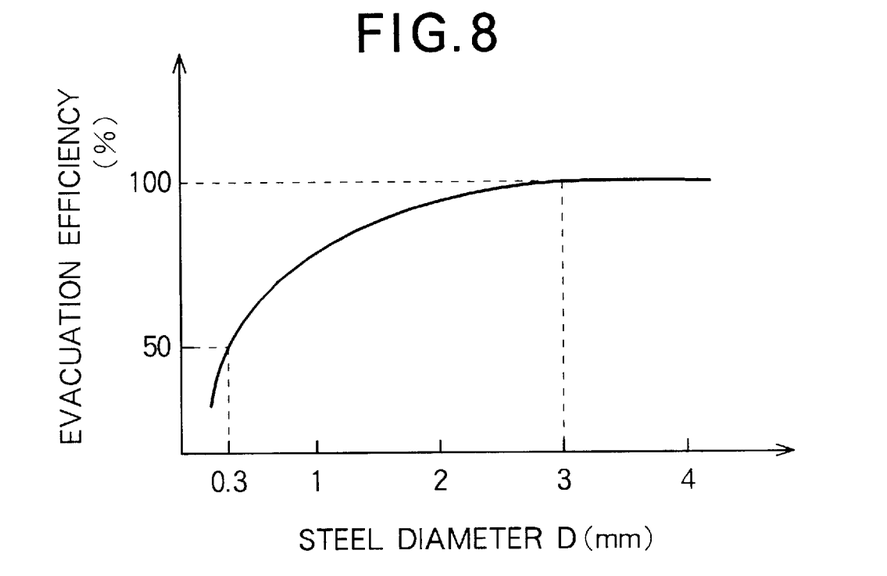
FIG. 8 is a graph showing the evacuation efficiency of the mold according to the first embodiment in relation to the diameter of steel balls employed as the metal particles.

Reference is now made to FIGS. 7 and 8 showing the thermal conductivity of the mold according to the first embodiment of this invention and its evacuation efficiency, respectively, in relation to the diameter D of the steel balls which its main body contains. FIG. 7 is a graph showing the diameter D (mm) of the steel balls along the axis of abscissa and the thermal conductivity (kcal/mh° C.) of the mold along the axis of ordinate. In order to shorten the cooling time for the mold to a desired level in a press forming operation, it is necessary to ensure that its thermal conductivity be equal to, or higher than a specific value of 1 kcal/mh° C. According to FIG. 7, the mold has a thermal conductivity equal to the specific value when the steel balls have a diameter D of 3 mm, and it is higher than the specific value if their diameter D is smaller than 3 mm, while it is lower than the specific value if their diameter D exceeds 3 mm. Thus, the mold has a thermal conductivity equal to, or higher than the specific value when the balls have a diameter not exceeding 3 mm.

FIG. 8 shows the diameter D (mm) of the steel balls along the axis of abscissa and the evacuation efficiency (%) of the mold along the axis of ordinate. The mold is required to have an evacuation efficiency of 50 to 100% in order to ensure the satisfactory vacuum suction of a panel or sheet as press formed. According to FIG. 8, the mold has an evacuation efficiency lower than 50% when the steel balls have a diameter smaller than 0.3 mm, and it is 50% when their diameter D is 0.3 mm. It is higher than 50% if their diameter D exceeds 0.3 mm, and it is 100% when their diameter D is equal to, or larger than 3.0 mm. Thus, the mold has an evacuation efficiency of 50 to 100% when the balls have a diameter D equal to, or larger than 0.3 mm.

Thus, it is obvious from FIGS. 7 and 8 that the mold has a satisfactorily high thermal conductivity and a satisfactorily high evacuation efficiency if the steel balls have a diameter D of 0.3 to 3.0 mm.

Figure 9:
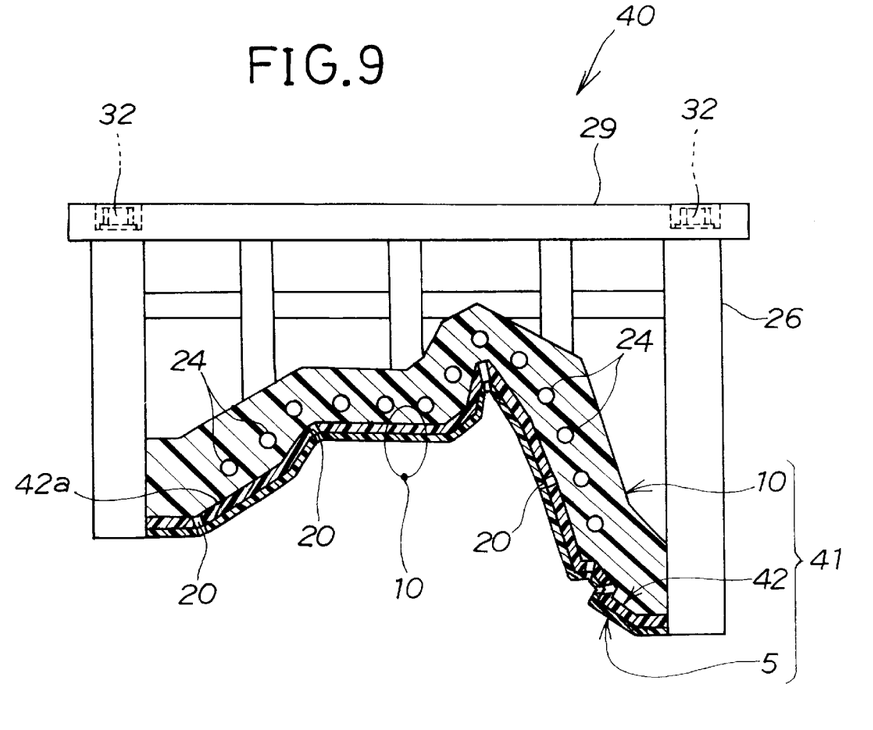
FIG. 9 is a view similar to FIG. 1, but showing a second preferred embodiment of this invention having an intermediate layer between a main body and a surface layer.
Figure 10:
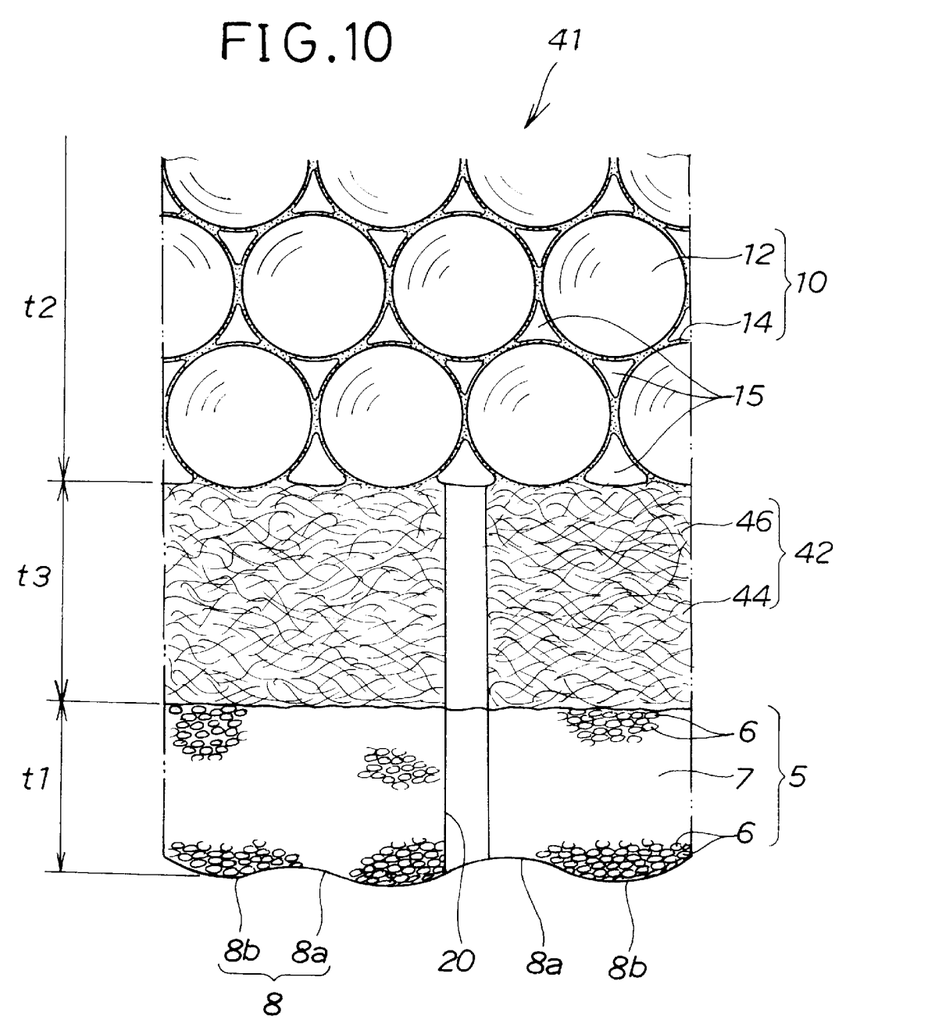
FIG. 10 is an enlarged view of the portion marked 10 in FIG. 9.

Reference is now made to FIGS. 9 and 10 showing a resin mold according to the second preferred embodiment of this invention. Like numerals are used to denote like parts throughout the drawings and description, so that no detailed description may have to be repeated.

The resin mold according to the second embodiment of this invention is shown at 41 in FIG. 9 with a mold 40. It comprises a main body 10, an intermediate layer 42 formed on its surface facing the mold cavity and a surface layer 5 formed on the surface of the intermediate layer 42. The intermediate layer 42 differentiates it from the mold according to the first embodiment as described before with reference to FIGS. 1 and 2. FIG. 10 shows an enlarged portion of the mold 41. The intermediate layer 42 is formed from a thermosetting epoxy, polyurethane or polyurea resin 44 and contains 3 to 50% by weight of a nonwoven metal fabric 46. It has a thickness t3 of, say, 1 to 5 mm.

The surface layer 5 has a higher coefficient of thermal expansion than that of the main body 10, since the former contains a higher proportion of resin, as stated in the description of the first embodiment. The proportion of the nonwoven metal fabric 46 as stated has been selected to define the proportion of the resin 44 giving the intermediate layer 42 a coefficient of thermal expansion which is lower than that of the surface layer 5, but higher than that of the main body 10. If it contains at least 3% by weight of nonwoven metal fabric 46, the intermediate layer 42 has a lower coefficient of thermal expansion than that of the surface layer 5, while at the same time having a sufficiently high strength to support the surface layer 5 thereon. The proportion of the nonwoven metal fabric 46 which it contains is, however, not higher than 50% by weight, so that it may contain a sufficiently high proportion of resin 44 to have a higher coefficient of thermal expansion than that of the main body 10, while enabling the nonwoven metal fabric 46 to be bound firmly by the resin 44. The intermediate layer 42 is effective for reducing any difference that may arise between the surface layer 5 and the main body 10 in the degree of thermal expansion and produce in e.g. the surface layer 5 the stress which may cause it to crack. A commercially available nonwoven fabric of stainless steel filaments having a diameter of, say, 10 to 15 microns is preferably used as the nonwoven metal fabric 46, though a product of any other metal having a high thermal conductivity can also be used.

Figure 11A:
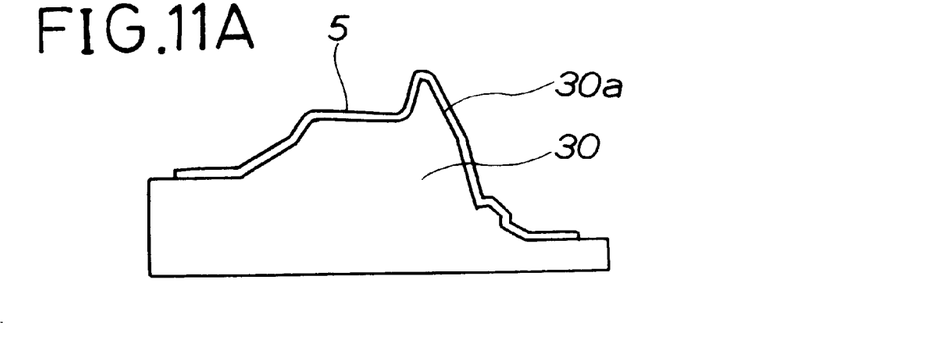
FIGS. 11A to 11F are a series of views illustrating a process for manufacturing the mold according to the second embodiment.
Figure 11B:
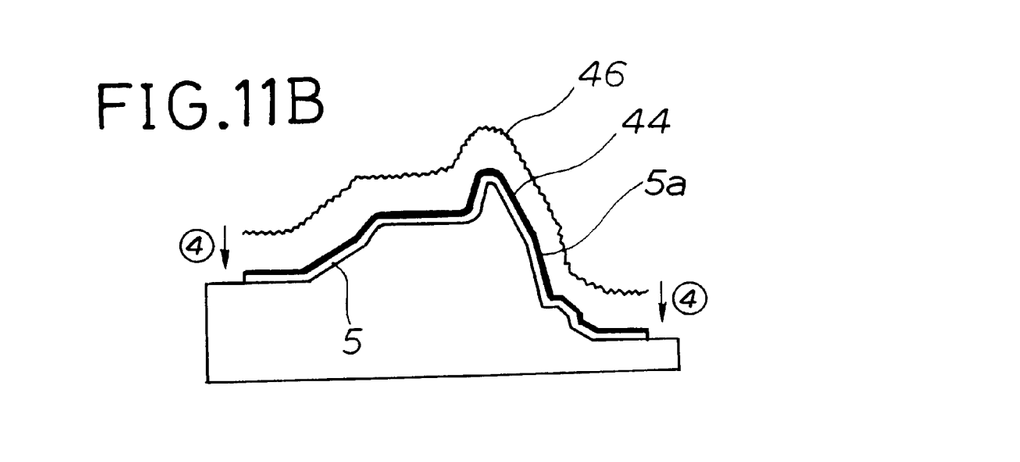
Figure 11C:
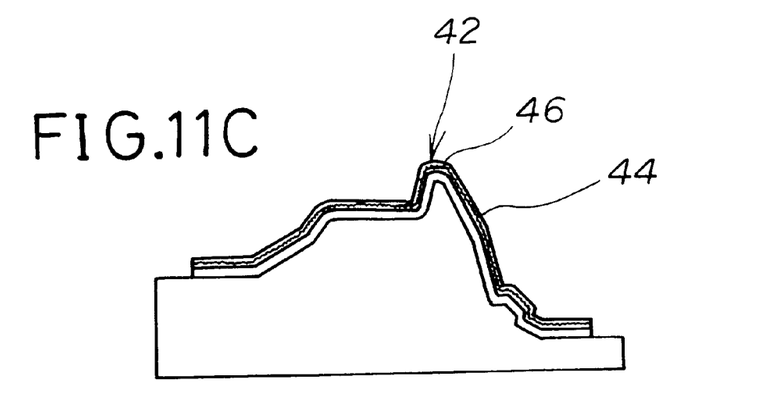
Figure 11D:
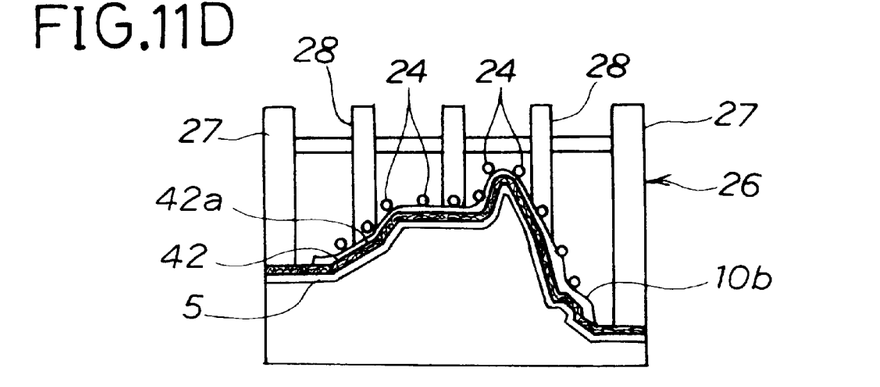
Figure 11E:
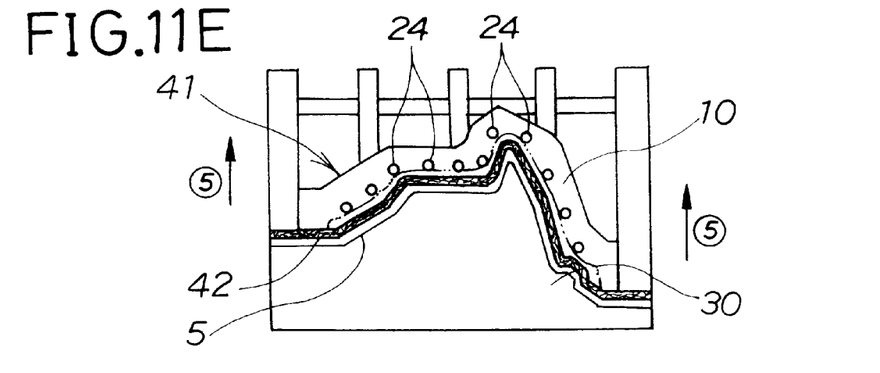
Figure 11F:
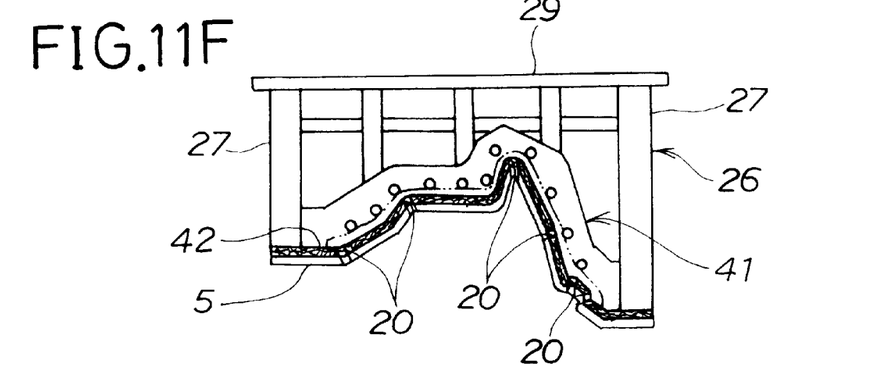

FIGS. 11A to 11F outline a process which can be employed for making a resin mold as described with reference to FIGS. 9 and 10. A thermosetting resin containing particles of silicon carbide is applied onto the surface 30a of a master model 30, and thermoset to form a surface layer 5, as shown in FIG. 11A. A thermosetting resin 44 is applied onto the rear surface 5a of the surface layer 5, and a nonwoven metal fabric 46 is lowered onto the resin 44 as shown by the arrow (4) in FIG. 11B. The resin 44 is applied onto the fabric 46 to form an intermediate layer 42 containing the fabric 46, as shown in FIG. 11C. A thermosetting resin containing metal balls is applied onto the rear surface 42a of the intermediate layer 42 to form a portion 10b of a main body 10 (FIG. 10) a few mm in thickness, as shown in FIG. 11D. A plurality of substantially equally spaced apart cooling pipes 24 are laid along the main body portion 10b, and a plurality of posts 27 and 28 are erected to form a framework 26, as shown in FIG. 11D. The resin containing metal balls is applied again around the pipes 24 to complete the main body 10, whereby a resin mold 41 is obtained, as shown in FIG. 11E. The mold 41 is lifted away from the master model 30, as shown by the arrow (5). A plate 29 is secured to the tops of the posts 27 by bolts 32 (FIG. 9) to complete the framework 26, as shown in FIG. 11F. Then, a plurality of evacuating bores 20 are made through the surface and intermediate layers 5 and 42 to complete the mold 41.

Figure 12A:
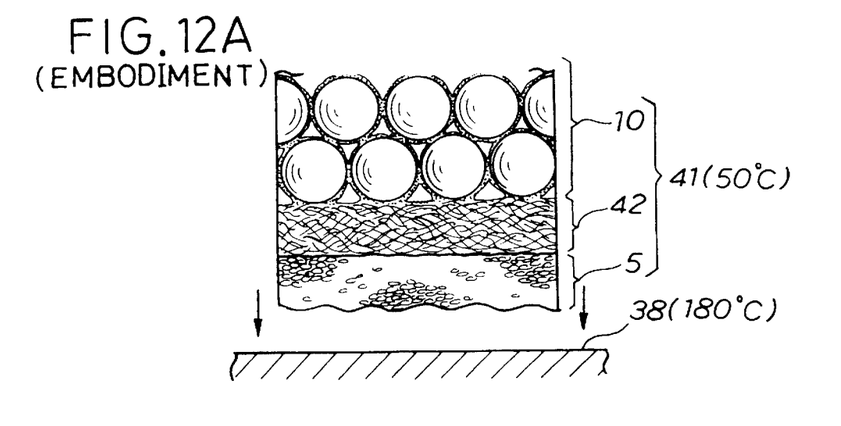
FIGS. 12A to 12C are a set of views explaining the differences in the degrees of thermal expansion of the main bodies, intermediate layers, if any, and surface layers of the molds embodying this invention and according to the prior art, respectively.
Figure 12B:
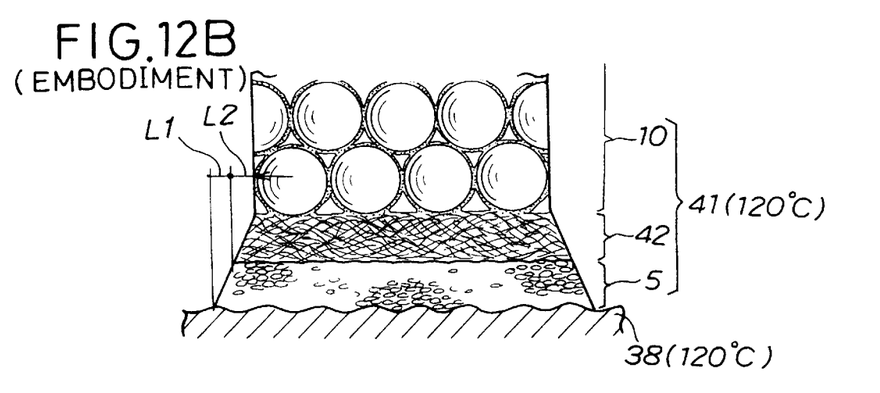
Figure 12C:
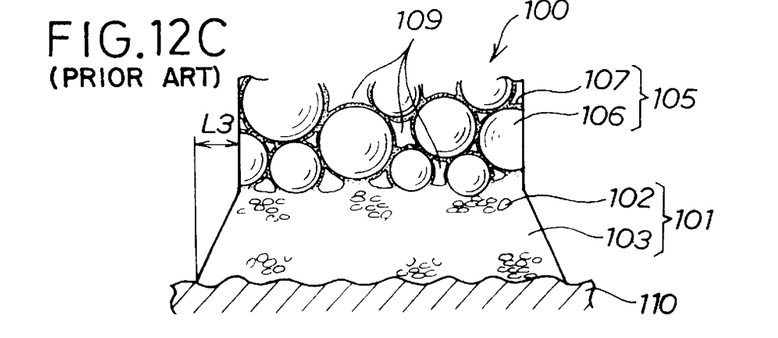

Reference is now made to FIGS. 12A to 12C comparing the resin molds embodying this invention and these of the prior art in respect of the results of the difference in the degree of thermal expansion from one layer to another. FIGS. 12A and 12B refer to this invention, and FIG. 12C to the prior art. Referring to FIG. 12A, a sheet 38 is heated to 180° C., while the resin mold 41 is cooled to 50° C., and the mold 41 is lowered toward the sheet 38. The sheet 38 is press formed by the mold 41, as shown in FIG. 12B. The heat of the sheet 38 is conducted through the surface layer 5, intermediate layer 42 and main body 10 of the mold 41, whereby the mold 41 has its temperature raised from 50° C. to upwards of 120° C. This causes the expansion of its surface layer 5, intermediate layer 42 and main body 10. There is, however, only a small difference L1 between the surface and intermediate layers 5 and 42 in the degree of expansion, so that there is not produced between those layers any stress which should cause them to crack. There is also only a small difference L2 between the intermediate layer 42 and the main body 10. Thus, the intermediate layer 42 can prevent the adverse results of any large difference that might arise between the surface layer 5 and the main body 10 in the degree of thermal expansion.

Referring now to FIG. 12C, a sheet 110 is heated to 180° C., while the mold 100 is cooled to 50° C., and the sheet 110 is press formed by the mold 100. The heat of the sheet 110 is conducted through the surface layer 101 of the mold 100 to its main body 105, whereby the mold 100 has its temperature raised from 50° C. to upwards of 120° C. This causes the expansion of its surface layer 101 and main body 105. While the surface layer 101 contains a high proportion of resin 103, as it closely fills the interstices between the aluminum flakes 102, the main body 105 contains a low proportion of resin 107, since the open spaces 109 for evacuation have to be formed between the aluminum particles 106. Therefore, the surface layer 101 and the main body 105 have so large a difference L3 in thermal expansion that a high stress is produced in the surface layer 101, which has its expansion restricted considerably by the main body 105, eventually causing it to crack.

Figure 13:
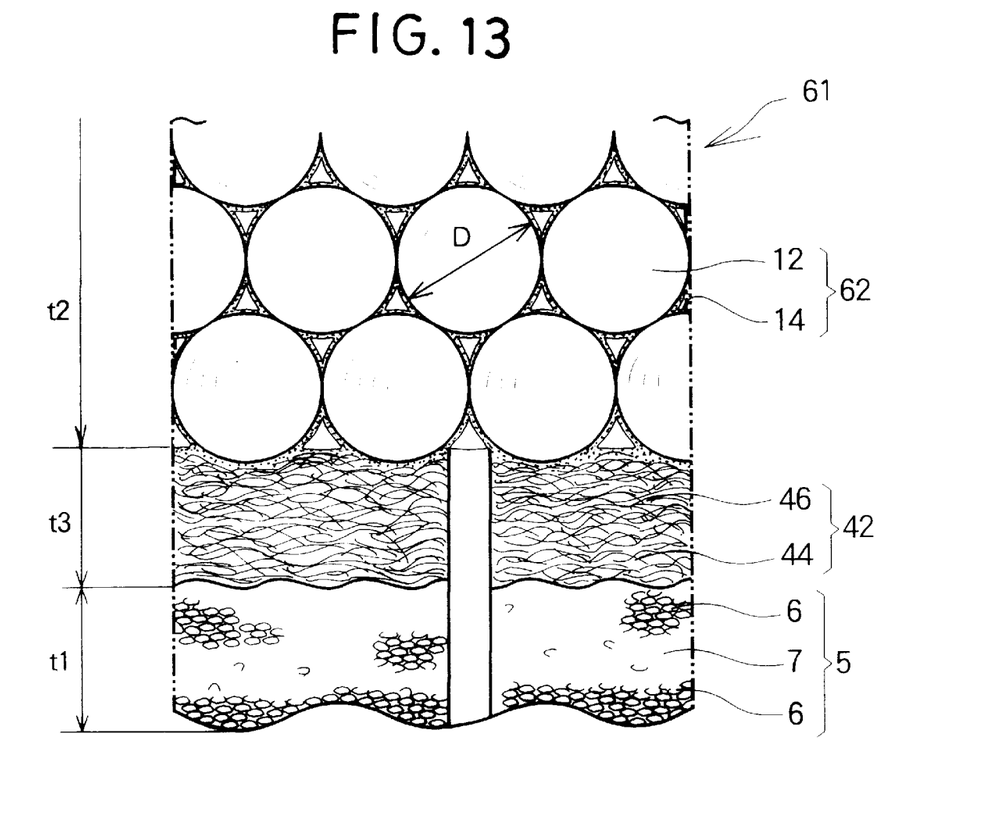
FIG. 13 is a view similar to FIG. 10, but showing a modified form of the mold, in which the adjoining metal particles in the main body are in direct contact with one another.

Reference is finally made to FIG. 13 similar to FIG. 10, but showing a modified form of the mold shown therein and having an intermediate layer 42. The modified mold 61 differs from the mold shown in FIG. 10 only in that every two adjoining steel balls 12 in its main body 62 are in direct contact with each other without being separated from each other by any epoxy, or other thermosetting resin 14. In this connection, the mold 61 is similar to that shown in FIG. 6, and its main body 62 likewise has a still higher thermal conductivity, while it can be evacuated more uniformly.

Obviously, various minor changes and modifications of the present inventions are possible in the light of the above teaching. It is therefore to be understood that within the scope of the appended claims the invention may be practiced otherwise than as specifically described.

What is claimed is:

1. A resin mold comprising:

a main body formed from metal particles joined together by a thermosetting resin and having a molding surface wherein said main body has open spaces formed by every adjoining three of said metal particles, said metal particles having a diameter of 0.3 to 3.0 mm;

an intermediate layer having evacuating bores formed on said molding surface from said thermosetting resin, and containing a nonwoven metal fabric;

a surface layer formed on said intermediate layer from said thermosetting resin and containing fine particles of silicon carbide wherein said silicon carbide occupies 50 to 80% by weight of said surface layer, said intermediate layer having a coefficient of thermal expansion which is lower than that of said surface layer, but higher than that of said main body; and a plurality of evacuating bores formed in said surface layer wherein said evacuating bores cooperate with said evacuating bores of said intermediate layer and said open spaces of said main body in evacuating said mold.

2. A resin mold of claim 1 wherein the thermosetting resin is a polyurea.

* * * * *